US011012361B2

(12) United States Patent
Ramachandran et al.

(10) Patent No.: US 11,012,361 B2
(45) Date of Patent: May 18, 2021

(54) MANAGING TRANSMISSION CONTROL PROTOCOL (TCP) TRAFFIC

(71) Applicant: Hughes Network Systems, LLC, Germantown, MD (US)

(72) Inventors: Ganeshan Ramachandran, Frederick, MD (US); Robert James Torres, New Market, MD (US); George Choquette, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/554,777

(22) Filed: Aug. 29, 2019

(65) Prior Publication Data
US 2021/0067452 A1    Mar. 4, 2021

(51) Int. Cl.
  *H04L 12/801*    (2013.01)
  *H04B 7/185*    (2006.01)
  *H04L 12/807*    (2013.01)

(52) U.S. Cl.
  CPC ....... *H04L 47/193* (2013.01); *H04B 7/18513* (2013.01); *H04L 47/11* (2013.01); *H04L 47/27* (2013.01)

(58) Field of Classification Search
  CPC ....... H04L 47/193; H04L 47/11; H04L 47/27; H04B 7/18513
  See application file for complete search history.

(56) References Cited

U.S. PATENT DOCUMENTS

| 6,115,750 | A  | 9/2000  | Dillon et al. |
| 6,370,114 | B1 | 4/2002  | Gullicksen et al. |
| 6,834,039 | B1 | 12/2004 | Kelly et al. |
| 6,961,539 | B2 | 11/2005 | Schweinhart et al. |

(Continued)

FOREIGN PATENT DOCUMENTS

| KR | 20070099095 | 10/2007 |
| WO | WO2008112774 | 9/2008 |
| WO | WO2015114466 | 8/2015 |

OTHER PUBLICATIONS

PCT International Search Report and Written Opinion in International Appln. No. PCT/US2020/047818, dated Oct. 30, 2020, 13 pages.

*Primary Examiner* — Duc C Ho
(74) *Attorney, Agent, or Firm* — Fish & Richardson P.C.

(57) ABSTRACT

A terrestrial terminal enables communications, over a network connection through a satellite, between a local host of one or more connected local hosts and a remote host. The terrestrial terminal is configured to perform operations comprising: receiving, from the remote host, a network packet for the local host; obtaining, from the network packet, an included TCP segment; determining, from the TCP segment, a receive window size advertised by the remote host; computing, using one or more characteristics of the network connection, a target receive window size; comparing the target receive window size with the advertised receive window size; and in response to determining that the target receive window size is different from the advertised receive window size: modifying the TCP segment by replacing the advertised receive window size with the target receive window size, and forwarding the network packet with the modified TCP segment to the local host.

20 Claims, 8 Drawing Sheets

(56) References Cited

U.S. PATENT DOCUMENTS

| | | |
|---|---|---|
| 7,082,467 B2 | 7/2006 | Border et al. |
| 7,213,077 B2 | 5/2007 | Border |
| 7,283,474 B1 | 10/2007 | Bergenwall |
| 7,562,130 B2 | 7/2009 | Dillon et al. |
| 7,613,118 B2 | 11/2009 | Appanna et al. |
| 7,643,416 B2 | 1/2010 | Pardee et al. |
| 7,656,813 B2 | 2/2010 | Kloper |
| 7,706,269 B2 | 4/2010 | Zhang et al. |
| 7,912,911 B2 | 3/2011 | Way et al. |
| 8,098,579 B2 | 1/2012 | Ray et al. |
| 8,125,904 B2 | 2/2012 | Lund |
| 8,363,549 B1 | 1/2013 | Zhu et al. |
| 8,417,828 B2 | 9/2013 | Ma et al. |
| 8,670,313 B2 | 3/2014 | Ray et al. |
| 8,705,357 B2 | 4/2014 | Tones et al. |
| 8,867,359 B1 | 10/2014 | Bishara |
| 8,977,191 B2 | 3/2015 | Jong et al. |
| 9,258,230 B2 | 2/2016 | Kootstra |
| 9,444,688 B2 | 9/2016 | Lee et al. |
| 9,813,346 B2 | 11/2017 | Pedersen |
| 9,832,169 B2 | 11/2017 | Border et al. |
| 2003/0032391 A1* | 2/2003 | Schweinhart ........... H04L 1/18 455/12.1 |
| 2005/0213596 A1 | 9/2005 | Cyganski et al. |
| 2006/0268708 A1* | 11/2006 | Speight ................. H04L 47/26 370/235 |
| 2008/0181108 A1 | 7/2008 | Hashmi et al. |
| 2010/0054123 A1 | 3/2010 | Yong |
| 2013/0136000 A1* | 5/2013 | Torres .................. H04L 47/27 370/235 |
| 2014/0133306 A1 | 5/2014 | Park |
| 2016/0134544 A1* | 5/2016 | Roy .................... H04B 7/185 370/235 |
| 2020/0007449 A1* | 1/2020 | Morin .................. H04L 47/193 |

\* cited by examiner

MANAGING TRANSMISSION CONTROL PROTOCOL (TCP) TRAFFIC

TECHNICAL FIELD

The following disclosure relates generally to managing Transmission Control Protocol (TCP) traffic, and in particular, to systems, methods and devices related to TCP traffic optimization in communications networks.

BACKGROUND

TCP provides reliable endpoint-to-endpoint transport of data over Internet Protocol (IP) flows between Internet hosts. TCP operation is usually optimized for reliable wired networks having low transit latency, but can be problematic for networks that have high transit latency or that are subject to packet loss due to propagation errors, such as wireless or satellite networks.

SUMMARY

The present disclosure describes systems, devices and methods related to use of a performance enhancing proxy (PEP) to optimize TCP traffic in communications networks. In some implementations, the PEP is used in Low Earth Orbit (LEO), Medium Earth Orbit (MEO), or elliptical orbit satellite communications systems. In such implementations, the TCP traffic flow or communications link capacity, or both, are optimized by manipulating (for example, adjusting and replacing) window size advertisements in end-to-end TCP signaling and traffic packets, to slow down or speed up the offered traffic rate of the sending host, consistent with available satellite bandwidth or link conditions, and avoiding congestion drops due to traffic overrun and associated cross-satellite retransmission.

In a general aspect, a system includes a terrestrial terminal configured to communicate with one or more connected local hosts, the terrestrial terminal enabling communications, over a network connection through a satellite, between a local host of the one or more connected local hosts and a remote host. The terrestrial terminal is configured to perform operations comprising: receiving a network packet from the remote host destined for the local host; obtaining, from the network packet, an included Transmission Control Protocol (TCP) segment; determining, from the TCP segment, a receive window size advertised by the remote host; computing, using one or more characteristics corresponding to the network connection, a target receive window size for the network connection; comparing the target receive window size with the advertised receive window size; and in response to determining that the target receive window size is different from the advertised receive window size: modifying the TCP segment by replacing the advertised receive window size with the target receive window size, and forwarding the network packet with the modified TCP segment to the local host.

Particular implementations may include one or more of the following features. In some implementations, the network packet is received in response to sending, to the remote host, a TCP connection request, wherein the TCP segment corresponds to a TCP SYN/ACK segment.

In some implementations, the operations further comprise: receiving, from the local host, a plurality of network packets, each network packet including a TCP data segment; determining whether an aggregate size of TCP data segments included in the plurality of network packets is within the advertised receive window size of the remote host; in response to determining that the aggregate size of the TCP data segments is greater than the advertised receive window size: sending, to the remote host over the network connection, a subset of the plurality of network packets, wherein an aggregate size of TCP data segments included in the subset is within the advertised receive window size, and buffering, in storage coupled to the terrestrial terminal, a remainder of the plurality of network packets; receiving, from the remote host, a new network packet including a TCP ACK segment, the TCP ACK segment acknowledging successful reception, by the remote host, of network packets sent from the local host; and in response to receiving the new network packet including the TCP ACK segment, sending, to the remote host over the network connection, one or more of the remainder of the plurality of network packets that are buffered in the storage.

In some implementations, the operations further comprise: receiving, from the local host, one or more network packets, each network packet including a TCP data segment; sending, to the remote host over the network connection, the one or more network packets; receiving, from the remote host, a new network packet including one of a TCP ACK segment or a TCP data segment, wherein the TCP ACK segment or the TCP data segment includes the advertised receive window size; and in response to receiving the new network packet, computing, using the one or more characteristics corresponding to the network connection, a new target receive window size for the network connection; comparing the new target receive window size with the advertised receive window size; and in response to determining that the new target receive window size is different from the advertised receive window size: modifying the TCP ACK segment or the TCP data segment by replacing the advertised receive window size with the new target receive window size, and forwarding the network packet with the modified TCP ACK segment or the modified TCP data segment to the local host.

In some implementations, the target receive window size is smaller than the advertised receive window size, and the new target receive window size is greater than the advertised receive window size.

In some implementations, the target receive window size is greater than the advertised receive window size, and the new target receive window size is greater than the target receive window size.

In some implementations, the target receive window size is greater than the advertised receive window size, and the operations further comprise: receiving, from the local host, one or more network packets, each network packet including a TCP data segment; sending, to the remote host over the network connection, the one or more network packets; identifying a local condition to reduce the target receive window size to the advertised receive window size; receiving, from the remote host, new network packets, each including one of a TCP ACK segment or a TCP data segment, wherein the TCP ACK segment or the TCP data segment includes the advertised receive window size; and forwarding, to the local host, the new network packets, including modifying the TCP ACK segment or the TCP data segment in each successive network packet by replacing the advertised receive window size with a successively lower target receive window size, until forwarding a network packet with the lowered target receive window size in a TCP ACK segment or a TCP data segment being equal to the advertised receive window size.

In some implementations, the operations further comprise: receiving, from the remote host over the network connection, one or more new network packets, each new network packet including a TCP data segment; forwarding, to the local host, the one or more new network packets; receiving, from the local host, a first network packet including a first TCP ACK segment, the first TCP ACK segment acknowledging successful reception, by the local host, of a new network packet sent from the remote host; buffering, in storage coupled to the terrestrial terminal, the first network packet; upon buffering the first network packet, starting a timer; before expiration of the timer, receiving, from the local host, a second network packet including a second TCP ACK segment, the second TCP ACK segment acknowledging successful reception, by the local host, of another new network packet sent from the remote host; and in response to receiving the second network packet before expiration of the timer: sending, to the remote host over the network connection, the second network packet including the second TCP ACK segment, and dropping the first network packet.

In some implementations, the operations further comprise: receiving, from the remote host over the network connection, one or more new network packets, each new network packet including a TCP data segment; forwarding, to the local host, the one or more new network packets; receiving, from the local host, a first network packet including a TCP ACK segment, the TCP ACK segment acknowledging successful reception, by the local host, of a new network packet sent from the remote host; buffering, in storage coupled to the terrestrial terminal, the first network packet; upon buffering the first network packet, starting a timer; determining whether another network packet is received from the local host before expiration of the timer; and upon expiration of the timer and in response to determining another network packet has not been received from the local host before expiration of the timer, sending, to the remote host over the network connection, the first network packet.

Implementations of the above techniques include methods, apparatus, and computer program products. One such computer program product is suitably embodied in one or more non-transitory machine-readable media storing instructions that, when executed by one or more processors, are configured to cause the one or more processors to perform the above-described actions.

The TCP traffic optimization realized by the PEP implementations described in this document reduces bandwidth wastage to resend packets due to packet drops (for example, due to congestion, link adaptation changes that affect effective link throughput, or beam handover pauses, among other reasons) when traffic is offered at a higher rate than it can be transported on the communications link. The disclosed implementations also do not have the overhead of a full PEP man in-the-middle protocol spoofing that is used with a TCP proxy in a traditional Geosynchronous (GEO) orbit satellite network.

The details of one or more disclosed implementations are set forth in the accompanying drawings and the description below. Other features, aspects, and advantages will become apparent from the description, the drawings and the claims.

BRIEF DESCRIPTION OF THE DRAWINGS

Like reference numbers in the figures indicate like elements.

DETAILED DESCRIPTION

Figure 1:
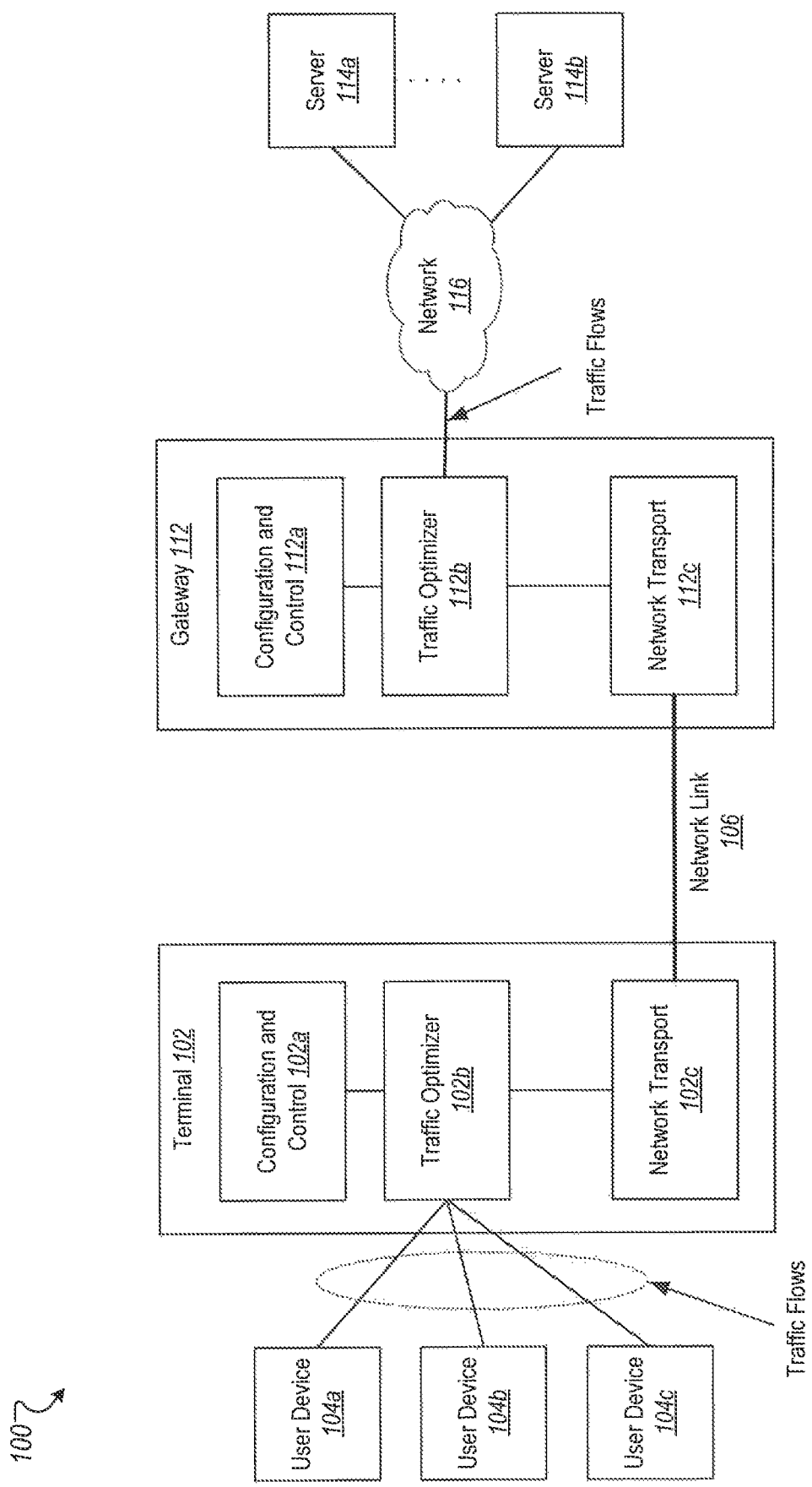
FIG. 1 illustrates an example of a communications system that uses TCP PEP functionality.

TCP provides reliable endpoint-to-endpoint transport of data over IP flows between Internet hosts. In aspects of TCP operation, each receiving host for a given TCP connection advertises a window value indicating how much data it is prepared to accept from the sending host. Each sending host embeds a successively increasing sequence number in its transmissions to enable the receiving host to detect missed or misordered packets, and each receiving host acknowledges data received in sequence from the sending host, which triggers retransmission by the sending host of missed or misordered data. In standard TCP implementation, missed packets, for example those not acknowledged by the receiving host, are assumed to be due to congestion drops in the intervening transport network, and cause end hosts to reduce window sizes, which slows the data throughput rate of the sender to align with a rate at which the transport network can deliver data without loss. Standard TCP operation is optimized for reliable wired networks that have low transit latency, but can have poor performance in networks that have high transit latency or are subject to packet loss due to propagation errors over wireless links, such as GEO satellite networks.

To address issues arising from high transit latency or propagation errors, GEO satellite networks sometimes employ PEP functions to optimize TCP performance. In these networks, the TCP PEP acts as a "man in the middle," breaking an end-to-end flow into separate terrestrial TCP connections at each end of the satellite system, with a satellite-optimized protocol in the middle. In this operation, a GEO satellite terminal or gateway "spoofs" the protocol so as to pretend to be the peer host. Particularly, the GEO terminal pretends to a locally attached host to be the far end Internet host, acknowledging and queuing packets for transmission over the GEO satellite, and managing satellite transmission using a satellite-optimized protocol. This enables the GEO terminal to overcome the otherwise slow startup and recovery behavior of TCP, and to avoid significant window reduction by end hosts in case of minor packet loss and retransmission over GEO satellite. Similarly, the GEO gateway pretends to the Internet host to be the end user host, performing similar protocol spoofing behavior. This segmented operation is transparent to the end hosts, and enables the GEO satellite system to facilitate faster connection establishment, faster traffic ramp-up and recovery, satellite retransmission of only those packets lost in propagation and not subsequent packets that would otherwise be out of order, better TCP window alignment with available bandwidth and link conditions, and better prioritization between flows and hosts.

In contrast to GEO satellite network, LEO satellite systems have satellite link transit latency close to that of terrestrial systems. The lower LEO latency enables TCP to be used with less of a slow start effect that is experienced in GEO satellite systems, and standard end-to-end TCP protocol operations, without use of TCP PEP optimization, are employed in traditional LEO systems to recover from packet loss due to congestion drops or propagation loss. However, this transparent carriage of TCP has the effect of wasting bandwidth to resend packets in event traffic is offered at a higher rate than it can be transported, either due to congestion, or link adaptation changes that affect effective link throughput, or beam handover pauses, among other reasons.

This document describes certain performance enhancing proxy optimizations, which are different from those used in a traditional GEO TCP PEP, for LEO satellite systems without the overhead of full PEP man-in-the-middle protocol spoofing. As described in detail below, in some implementations, traffic flow and capacity are optimized by manipulating (for example, adjusting and replacing) window size advertisements in end-to-end TCP signaling and traffic packets so as to slow down or speed up the sending host offered traffic rate, consistent with available satellite bandwidth or link conditions, and avoiding congestion drops due to traffic overrun and associated cross-satellite retransmission. The disclosed techniques involve altering the TCP receive window (for example, the value advertised by a receiving host to a peer sending host for how much data the sending host can send to the receiving host) advertised in traffic and signaling packets delivered to end hosts, based on one or more of the following factors:

Knowledge of satellite transport (for example, framing or multiplexing)
Real time link conditions
Real time bandwidth availability and allocation
Satellite terminal or gateway traffic queue depth, for traffic queued to be sent over the satellite transport
Priority of traffic flows
Other configuration and control information The implementations are described in the following sections primarily with respect to LEO satellite systems. However, the disclosed techniques are also applicable to MEO satellite systems, or for satellites in other orbital patterns such as elliptical orbits.

FIG. 1 illustrates an example of a communications system 100 that uses TCP PEP functionality. As shown, the communications system 100 includes a terminal 102, one more user devices 104a, 104b and 104c, a gateway 112, and one or more servers 114a and 114b. The terminal 102 is connected to the gateway 112 over a network link 106, while the gateway 112 is connected to the servers 114a and 114b through a network 116.

As described in the following sections, in some implementations, the system 100 is a satellite communications system, for example, a LEO (or MEO or elliptical orbit) satellite system. In such implementations, the terminal 102 is a satellite terminal, the gateway 112 is a satellite gateway, and network link 106 is a satellite channel, representing both the satellite uplink and the downlink. However, in other implementations, the system 100 is a wireless communications system other than a satellite network. In such implementations, the network link 106 includes a wireless communications channel independent of a satellite, for example, a Wi-Fi connection.

Reverting to implementations involving a LEO satellite, the system 100 represents a section of the overall communications system, showing an example of how the disclosed traffic performance optimization techniques are deployed in a LEO satellite network. The system 100 is not intended to show a complete traffic processing system of a satellite terminal or gateway (for example, satellite handover control and other functional components are omitted), nor is it implied that this and subsequent diagrams and text represent the only functional structure that might be used to implement the disclosed optimization techniques. For example, although only one terminal 102 is shown, in some implementations, the system 100 includes a plurality of such terminals distributed over a geographic area serviced by the system 100, with each user location being served by one or more terminals that are connected to the corresponding user devices. Similarly, although only one gateway 112 is shown, in some implementations, the system 100 includes a plurality of such gateways that are distributed over a geographic area serviced by the system 100, with each gateway being connected to one or more servers. In some implementations, transmission via a LEO satellite includes transmission across a satellite constellation, in which LEO satellites are connected by inter-satellite links and forward traffic between satellites.

The terminal 102 includes circuitry for configuration and control 102a; circuitry for a traffic optimizer 102b; and circuitry for network transport 102c, among other hardware. The gateway 112 includes similar circuitry for configuration and control 112a; circuitry for a traffic optimizer 112b; and circuitry for network transport 112c, among other hardware. Each of the above circuitry includes one or more processors for performing various operations disclosed in this document, and storage media for storing data and instructions. The processors perform the disclosed operations by executing the instructions stored in the storage media. The different circuitry in the terminal or the gateway can be implemented as different pieces of hardware, for example, discrete application specific integrated circuit (ASIC) chips that are connected to one another using electrical connections, for example, on a printed circuit board (PCB). Additionally or alternatively, some or all of the circuitry in the terminal or the gateway can be implemented together on general purpose integrated circuit (IC) chips.

In some implementations, the terminal 102 is on the user side and the gateway 112 is on the network side of the communications system 100. For example, the terminal 102 can be a very small aperture terminal (VSAT) in an office or a residential location that is connected to the user devices 104a, 104b and 104c over a local area network (LAN). The user devices 104a, 104b and 104c can be personal computers (for example, laptops or desktops), workstations, or mobile computing devices (for example, tablet computers or smartphones), among others. The gateway 102 can be a satellite gateway that is connected to the servers 114a and 114b through the network 116 (for example, the Internet). The servers 114a or 114b, or both, can be web servers for Internet traffic (for example, web browsing or streaming traffic), or file servers or enterprise servers (for example, for storing and supplying user content).

The traffic optimizers 102b and 112b execute functions of the PEP in the terminal 102 and the gateway 112, respectively. Functions implemented by the traffic optimizers are the same irrespective of whether it is located in the terminal 102 or in the gateway 112. In some implementations, operations of the traffic optimizers 102a and 112a are coordinated. However, in other implementations, the traffic optimizers 102a and 112a do not interact with each other. In such implementations, each optimizer is deployed, configured and controlled independently, and TCP traffic optimization can be performed at only one section of the system 100 (for example, within the terminal 102 and not within the gateway 112, or vice versa).

Figure 2:
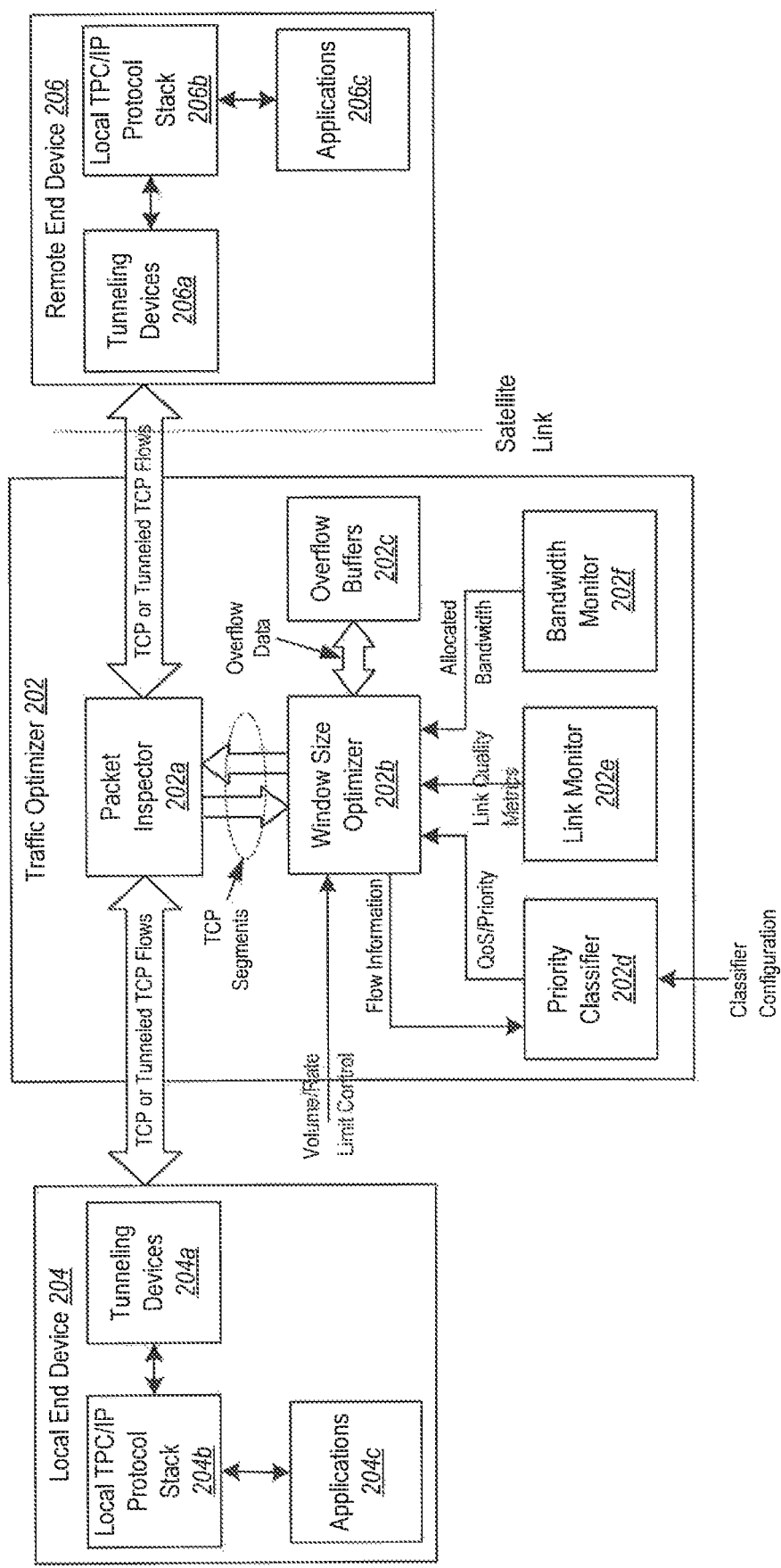
FIG. 2 is a block diagram illustrating the functional components of an example of a TCP PEP traffic optimizer connected to a local end device and a remote end device.

FIG. 2 is a block diagram 200 illustrating the functional components of an example of a TCP PEP traffic optimizer 202 connected to a local end device 204 and a remote end device 206. The traffic optimizer 202 executes functions of a PEP. As shown, the traffic optimizer 202 is proximate to the local end device 204, and connected to the remote end device 206 over a satellite link. In some implementations, the local end device 204 is similar to one of the user devices 104a, 104b or 104c, and the remote end device 206 is similar to one of the servers 114a or 114b. In such implementations, the traffic optimizer 202 is similar to the traffic optimizer 102b. In other implementations, the local end device 204 is similar to one of the servers 114a or 114b, and the remote end device 206 is similar to one of the user devices 104a, 104b or 104c. In these other implementations, the traffic optimizer 202 is similar to the traffic optimizer 112b.

As shown by the block diagram 200, the traffic optimizer 202 includes a packet inspector 202a, a window size optimizer 202b, overflow buffer 202c, a priority classifier 202d, a link monitor 202e and a bandwidth monitor 202f. The local end device 204 includes tunneling devices 204a (that use tunneling protocols), a local TCP/IP protocol stack 204b and applications 204c. The remote end device 206 similarly includes tunneling devices 206a (that use tunneling protocols), a remote TCP/IP protocol stack 206b and applications 206c.

The packet inspector 202a is connected to the tunneling devices 204a and 206a in the local and remote end devices 204 and 206, respectively, over TCP or tunneled TCP flows, which are through, for example, the network link 106 or the network 116, or both. The packet inspector 202a transparently intercepts link layer (for example, medium access control (MAC) layer) frames with IP packets received over the TCP or tunneled TCP flows. The packet inspector 202a inspects the header of each packet and diverts packets with TCP or tunneled TCP payloads for optimization, while allowing other types of packets to pass transparently between the local and the remote ends.

When handling tunneled TCP traffic, the packet inspector 202a extracts the TCP segment out of the encapsulating packet and forwards the TCP segment to the window size optimizer 202a. The packet inspector 202a saves the corresponding encapsulating packet headers and associated tunnel context information. The TCP segment is returned to the packet inspector 202a after being processed by the window size optimizer 202b. The packet inspector 202a re-encapsulates the optimized TCP segment with the same tunnel information, using the saved encapsulating packet headers and the context information, and then forwards the packet to the destination (for example, the local end device 204 or the remote end device 206).

The window size optimizer 202b tracks the state for one or more TCP connections that are processed by the traffic optimizer 202, and maintains the following information for each tracked TCP connection:
  a) Connection state (for example, in progress, established, idle, or release in progress).
  b) Traffic state (for example, slow start or congestion avoidance).
  c) Window size advertised by the remote end device 206.
  d) Window size that is advertised by the traffic optimizer 202 towards the local end device 204.
  e) Priority information.
  f) Most recent TCP acknowledgement (ACK) information along with timestamp at which the TCP ACK was received. This information is maintained for both directions of traffic flow (local-to-remote and remote-to-local).
  g) Sequence number of the most recent n data segments (n is an integer>0), the timestamp at which these segments were received, and the total amount of data that is unacknowledged. This information is maintained for both directions.

The window size optimizer 202b combines information available on traffic flows and their associated priorities, satellite link conditions, allocated bandwidth and the state of the TCP connection to determine the optimal TCP receive window size (also referred to as "receive window size" or simply "window size") for each traffic flow. In some cases, the window size optimizer 202b modifies TCP segments that are received from the remote end device 206 to adjust the receive window size of the remote end device 206, and then the packet with the modified TCP segment is sent to the local end device 204. The window size optimizer 202b adheres to one or more of the following conditions when manipulating the window size:
  a) TCP ACKs are not autonomously generated to convey changes to the TCP receive window size.
  b) Changes to the TCP receive window size are piggy backed on the TCP segments received from the remote end device.
  c) Right edge of the window does not shrink (with respect to the previous announcement).
  d) The modified TCP receive window size is a multiple of the TCP MSS (maximum segment size).

The amount by which the TCP receive window size changes can be different for different TCP connections, being based on multiple factors such as connection priority or number of prior changes, among others. In some implementations, the window size optimizer 202b estimates the optimal TCP receive window size for a connection based on one or more of the following parameters to detect periodic or cyclic patterns in traffic: historical or trend information on flow priority; satellite link conditions; or bandwidth allocations.

While the primary function of window size optimizer 202b is the manipulation of the TCP receive window size, the information maintained by the window size optimizer 202b also enables the reduction in the number of TCP ACKs generated by the local end device that are forwarded over the satellite link towards the remote end device. In doing so, the amount of satellite bandwidth consumed by TCP ACKs is reduced. The operations of the traffic optimizer 202 to reduce the number of TCP ACKs are described in detail below.

The traffic optimizer 202 uses the overflow buffer 202c to store excess data sent by the local end device 204 when the window size that is advertised by the traffic optimizer 202 to the local end device 204 (using the modified TCP segments) is larger than the receive window size advertised by the remote end device 206. The traffic optimizer 202 also uses the overflow buffer 202c to temporarily store data under degraded link conditions. TCP segments from the local end device 204 for a given TCP traffic flow are stored in the overflow buffer 202c in the same order as received at the traffic optimizer 202 for the given TCP traffic flow, while awaiting transmission towards the remote end device 206. If the window size advertised by the remote end device 206 cannot accommodate the next TCP segment in its entirety, then the traffic optimizer 202 delays transmission of the next TCP segment until enough window space is available at the remote end device. The delayed TCP segment is held in the overflow buffer 202c. To prevent deadlocks, the traffic optimizer 202 resets the TCP connection if the condition where the next TCP segment cannot be transmitted due to smaller window size advertised by the remote end, does not clear within a specified time duration. In some implementations, the time duration is configurable, e.g., can be set by a network administrator managing the traffic optimizer 202 device. In this context, it is to be noted that, while the ordering of TCP segments in the overflow buffer 202c is preserved for a given TCP connection, the ordering is not preserved across TCP connections. TCP connections with different combinations of local and remote end devices can have different window sizes.

The priority classifier 202d uses information from the TCP/IP header or link layer header, or both, of a packet, along with configuration information, to associate a priority value to the TCP traffic flow. In some implementations, the traffic optimizer 202 provides more system resources (e.g., bandwidth or buffer space) to higher priority TCP flows compared to lower priority TCP flows.

The link monitor 202e uses link metrics (for example, signal quality, signal power, coding scheme, or symbol rate, among others) to determine if the satellite link is at an optimal operating point. In some implementations, the link monitor 202e is aware of the characteristics of the underlying satellite physical layer and corresponding transmission and reception characteristics. In some implementations, in addition to real time link conditions, the link monitor 202e uses statistical data or weather information, or both, to predict the link condition.

The location of the traffic optimizer 202 determines if the forward link or the return link is monitored. For example, the return link is monitored when the traffic optimizer 202 is located on the terminal 102 side and the forward link is monitored when the traffic optimizer 202 is located on the gateway 112 side. For example, in some cases, traffic optimizer 102b monitors the return link, while traffic optimizer 112 monitors the forward link. However, in some other cases, the reverse is true.

The bandwidth monitor 202f tracks the bandwidth allocated to the terminal, for example, terminal 102. This is the case, for example, when the system includes a plurality of terminals sharing the bandwidth of the satellite link. In some implementations, the bandwidth monitor 202f is aware of the transmission framing schemes and bandwidth allocation protocols used by the underlying satellite network transport, such that the bandwidth monitor 202f can track the bandwidth allocations and the associated overheads. In some implementations, in addition to real time monitoring of bandwidth allocations, the bandwidth monitor 202f uses statistical data or network load, or both, to predict bandwidth availability.

The location of the traffic optimizer 202 determines if forward or return link bandwidth allocation is monitored. The return link bandwidth allocations are monitored when the traffic optimizer 202 is located on the terminal 102 side, while the forward link bandwidth allocations are monitored when the traffic optimizer 202 is located on the gateway 112 side. For example, in some cases, traffic optimizer 102b monitors the return link bandwidth allocations, while traffic optimizer 112 monitors the forward link bandwidth allocations. However, in some other cases, the reverse is true.

The following sections describe the TCP protocol interactions by which the traffic optimizer 202 employs changes to the TCP receive window size to optimize TCP traffic flows. In some implementations, the window size optimizer 202b is the traffic optimizer 202 component that is primarily responsible for the manipulation of the window size. As described above, in some implementations, the traffic optimizer 202 is similar to the traffic optimizer 102b or 112b. Accordingly, the following sections are described interchangeably with respect to the traffic optimizer 202 and the system 100.

Figure 3:
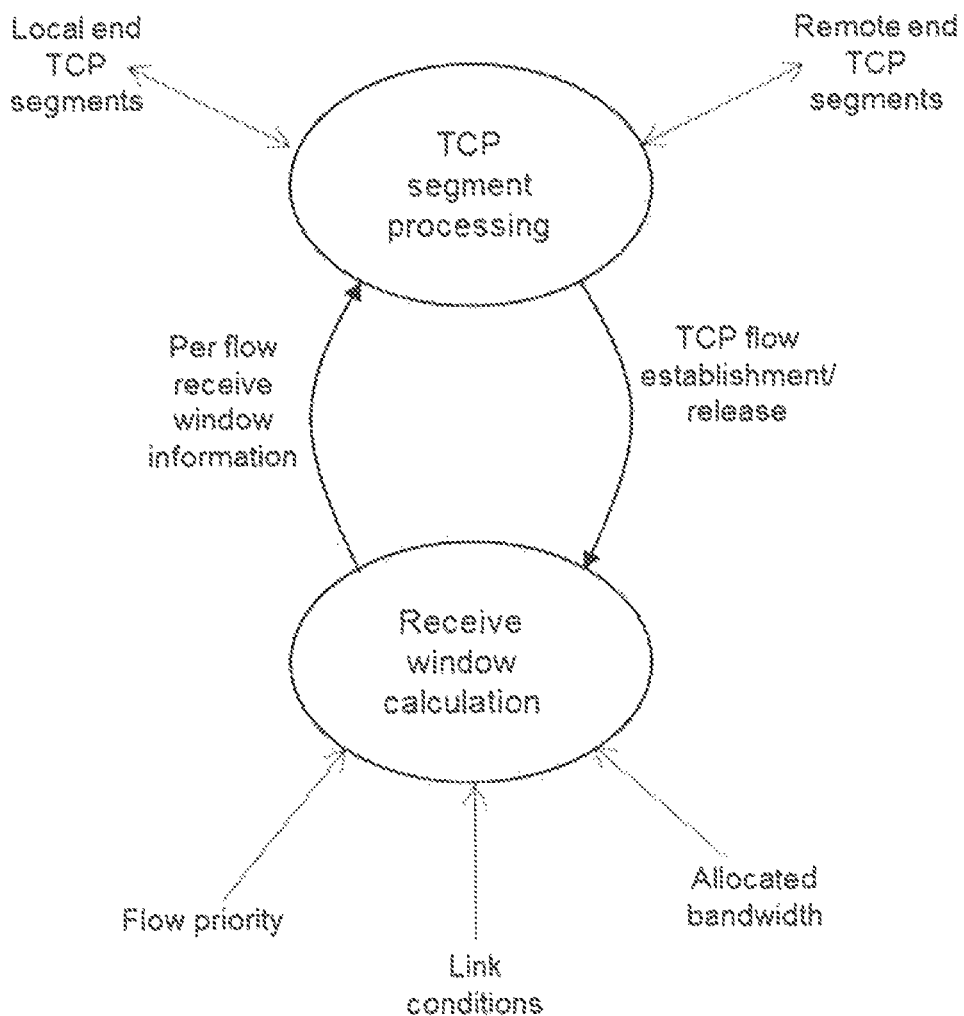
FIG. 3 illustrates an example of a state diagram showing the processing sequences for adjusting the TCP receive window size.

FIG. 3 illustrates an example of a state diagram 300 showing the processing sequences for adjusting the TCP receive window size. In some implementations, the processing sequences corresponding to operations performed by the traffic optimizer 202. As shown by the state diagram 300, there are two main processing sequences:

a) TCP segment processing.
  b) Receive window size calculation.

The two processing sequences operate cooperatively to implement the window size changes. The TCP segment processing includes TCP ACK reduction handling. The receive window size calculation can be performed periodically or asynchronously, or both.

Figure 4:
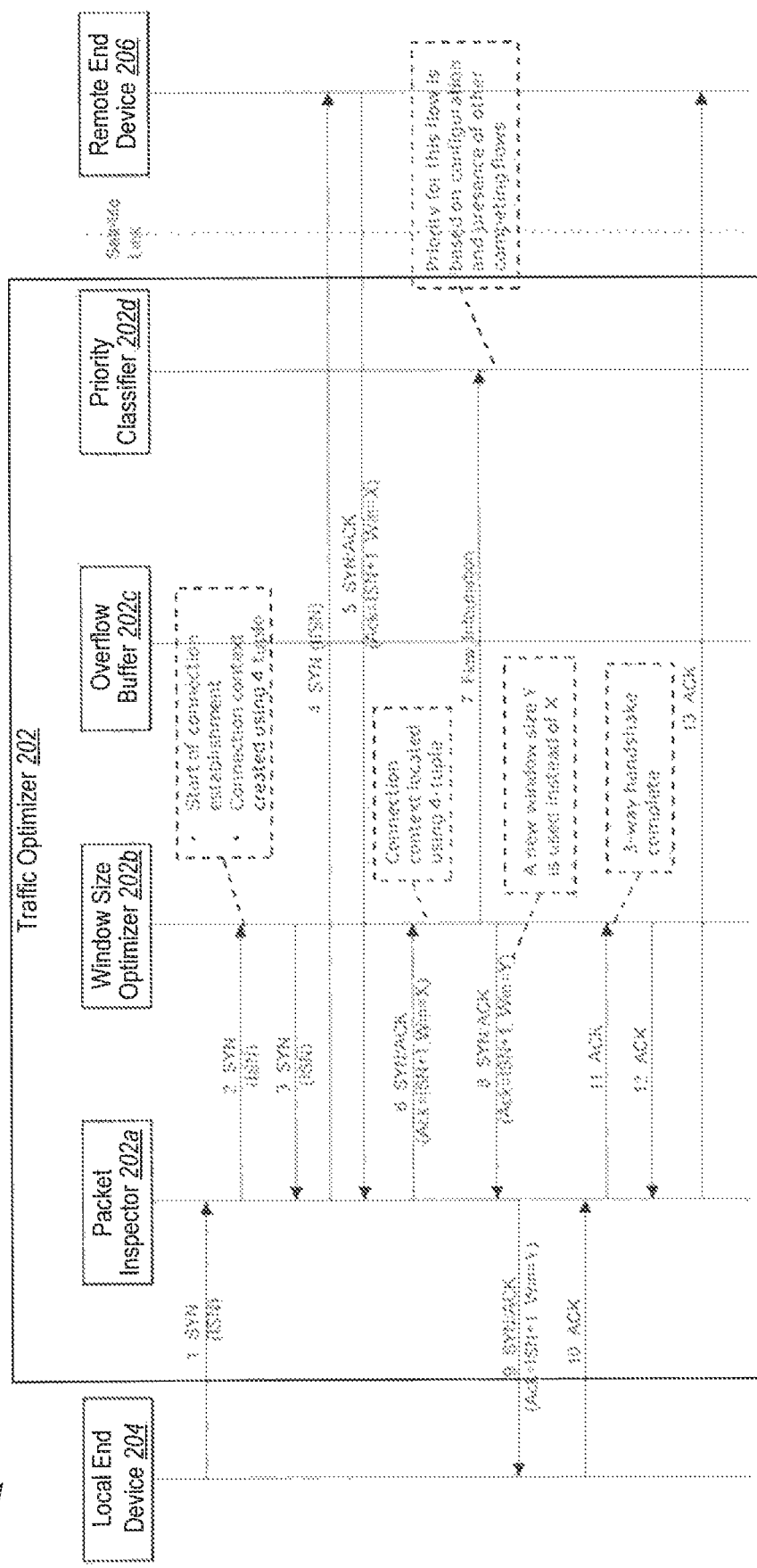
FIG. 4 illustrates a timing diagram showing a sequence of TCP protocol interactions among the traffic optimizer, local end device and remote end device for TCP connection establishment.

FIG. 4 illustrates a timing diagram 400 showing a sequence of TCP protocol interactions among the traffic optimizer 202, local end device 204 and remote end device 206 for TCP connection establishment. Only those components of the traffic optimizer 202 involved in the protocol interactions are shown for clarity and simplicity.

As shown by the timing diagram 400, the TCP connection establishment is initiated by the local end device 204. At (1), the local end device 204 sends an IP packet carrying a TCP SYN segment, which is received by the packet inspector 202a in the traffic optimizer 202. At (2), the packet inspector 202a detects that the payload is a TCP segment, saves context information, and diverts the TCP segment along with IP header information towards the window size optimizer 202b.

The window size optimizer 202b examines the IP and TCP header information and determines that the segment is start of a new TCP connection. Upon making this determination, the window size optimizer 202b allocates a new TCP connection control block (CCB) to track this new TCP connection. This CCB is accessible by a hash of a 4-tuple [source address, source port, destination address, destination port], which allows fast access to the control information.

At (3), the window size optimizer 202b returns the TCP segment to the packet inspector 202a unmodified. At (4), the packet inspector 202a reconstructs the entire TCP/IP packet and then sends the packet towards the remote end device 206 over the satellite link (4).

At (5), the traffic optimizer 202, and specifically the packet inspector 202a, receives a TCP SYN/ACK segment from the remote end device 206. At (6), the packet inspector 202*a* diverts the TCP SYN/ACK segment with IP header information to the window size optimizer 202*b*.

Upon receiving the TCP SYN/ACK segment, the window size optimizer 202*b* generates a hash of the source address, source port, destination address, and destination port obtained from the header information, and then retrieves the CCB associated with the corresponding TCP connection by using the hash of the 4-tuple. The CCB is updated with the window size advertised by the remote end device 206. For example, as shown in the figure the remote end advertises a window size of "X" bytes in the SYN/ACK segment.

The receipt of the TCP SYN/ACK segment indicates that the remote end device 206 has accepted the TCP connection request from the local end device 204, such that the connection can be considered established (implementation should however handle missing ACKs). At (7), the window size optimizer 202*b* informs the priority classifier 202*d* to assign a priority/quality of service (QoS) attributes to the TCP flow, sending the flow information to the priority classifier 202*d*. To assign the priority to the flow, the priority classifier 202*d* considers the following parameters:

a) Configuration, which can include a multi-field classifier based on header values, for example, address, port, or differentiated services code point (DSCP), among others.
  b) Run time conditions.

The priority/QoS attributes are subsequently used during the periodic or asynchronous receive window size calculation processing. The priority value can change during the lifetime of the TCP connection.

The window size optimizer 202*b* computes the optimal window size ("Y" bytes) for the unidirectional flow, from the local end towards the remote end, for the TCP connection based on:

a) Priority of this particular TCP connection relative to other TCP connections that are active.
  b) Current and predicted link conditions of the satellite link.
  c) Current and predicted bandwidth allocations and queue depths for transmission over the satellite link using those bandwidth allocations.
  d) Configuration/control information that indicates specialized handling for TCP connections that match specific criteria.

The window size optimizer 202*b* inserts the new window size (Y) into the TCP SYN/ACK segment and recalculates TCP checksum for the segment due to the change in the window size. The CCB for the TCP connection is also updated with the original window size (X) and new window size (Y). At (8), the window size optimizer 202*b* sends the TCP SYN/ACK segment, with the new window size (Y), back to the packet inspector 202*a*. At (9), the packet inspector 202*a* forwards the TCP SYN/ACK segment with the new window size (Y) to the local end device 204.

In some implementations, the window size optimizer 202*b* changes (for example, increases or decreases) the window size field in the SYN/ACK if a determination is made that such a change would optimize the TCP traffic flow. For example, under low traffic/usage conditions the window size advertised by the remote end can be satisfied with available bandwidth without excessive queuing. In such cases, the window size may not be changed, but the original window size (X) advertised by the remote end may be used.

In some implementations, if the window size optimizer 202*b* determines that the window size should be reduced compared to what was advertised by the remote end device, then that change happens at connection establishment and not at another time in the lifetime of the TCP flow. Otherwise, setting the window size to a lower value (without acknowledging data), during data transfer, than what was advertised by the remote end at the start of the TCP connection can cause the receive window to shrink, which is avoided. However, a larger window size, e.g., increasing the window size, compared to what was advertised by the remote end device, can occur during data transfer or at connection establishment.

The window size optimizer 202*b* periodically evaluates if further changes to the window size would be useful, or if the window size can be restored back to the original size advertised by the remote end device. When the window size Y advertised to the local end device is less than the value X advertised by remote end device, i.e., Y<X, the window size can be restored by forwarding the TCP ACK from the remote end device on to the local end device without altering the TCP header fields. In such cases, the window size optimizer 202*b* updates the CCB to reflect that the window size has been restored to the value X advertised by remote end device. However, when the window size Y advertised to the local end device is larger than the actual window size X from the remote end device, i.e., Y>X, then the restoration sequence can take multiple ACK segments to complete. In such cases, the window size optimizer 202*b* gradually reduces the window size field in successive TCP ACK segment from the remote end device that acknowledges data, e.g., where the left edge of the window moves right, such that the right edge of the window size field does not shrink.

Upon receiving the TCP SYN/ACK segment with the modified window size Y from the traffic optimizer 202 (more specifically, from the packet inspector 202*a*), at (10), the local end device 204 sends a TCP ACK segment back, which is intercepted by the packet inspector 202*a*. At (11) and (12), the packet inspector 202*a* and the window size optimizer 202*b* exchange TCP ACK segments to signal completion of the TCP 3-way handshake from the local end device, and the window size optimizer 202*b* updates the CCB to track that the 3-way handshake is complete. At (13), the packet inspector sends a TCP ACK to the remote end device 206 to confirm completion of TCP connection establishment.

Figure 5:
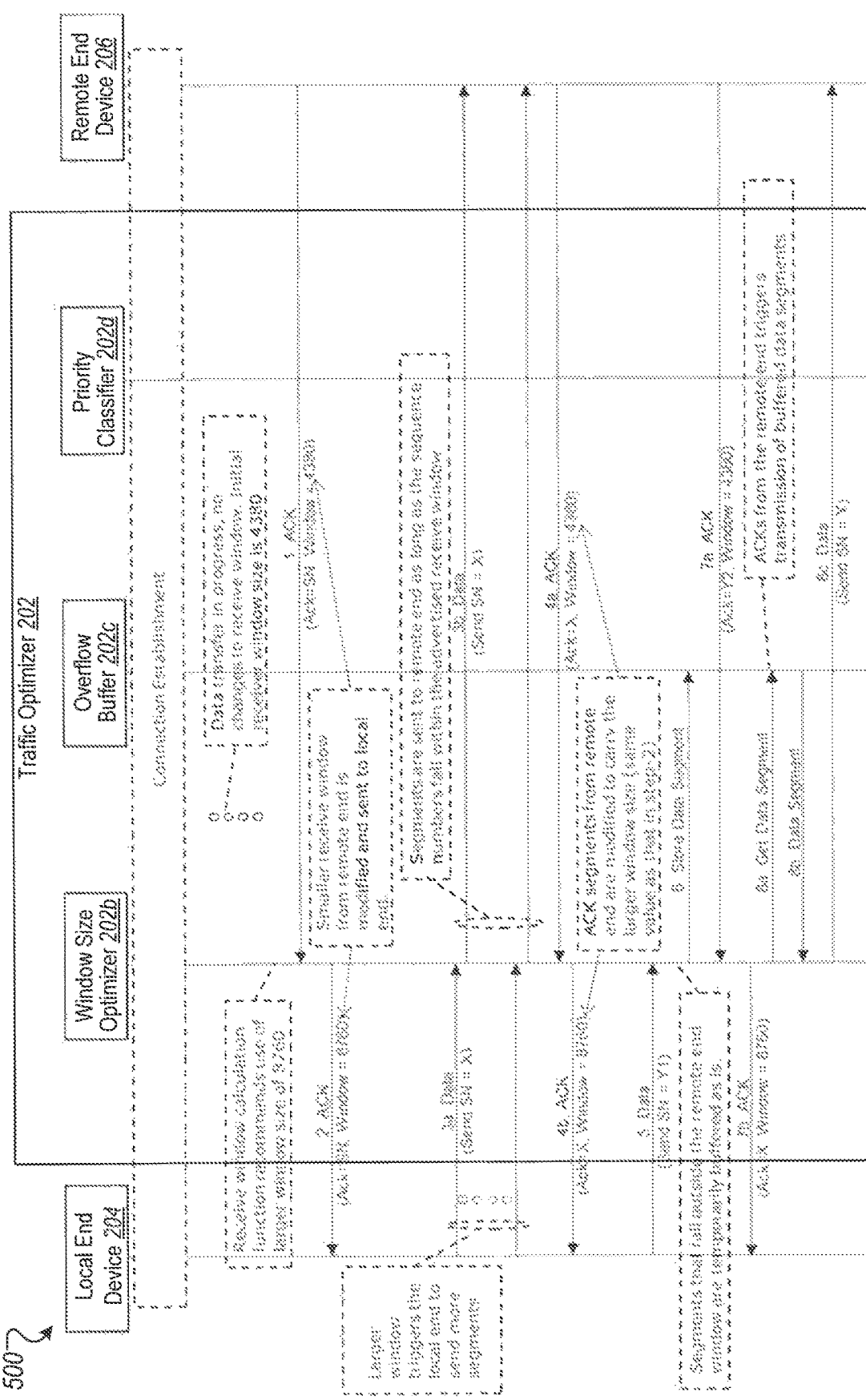
FIG. 5 illustrates a timing diagram showing a sequence of TCP protocol interactions among the traffic optimizer, local end device and remote end device for TCP data transfer.

FIG. 5 illustrates a timing diagram 500 showing a sequence of TCP protocol interactions among the traffic optimizer 202, local end device 204 and remote end device 206 for TCP data transfer. Only those components of the traffic optimizer 202 involved in the protocol interactions are shown for clarity and simplicity.

Following the TCP connection establishment described with respect to timing diagram 400, during the data transfer phase, the window size optimizer 202*b* periodically recalculates the TCP receive window size, indicating that the receive window can be increased for this specific TCP connection. The increase in window size, compared to that at start of connection, can be triggered during data transfer. That is, the increased window size can be advertised at any time, at connection established or during data transfer. For example, at (1), the remote end device 206 sends a TCP ACK segment that advertises a window size of 4380 bytes. The window size optimizer 202*b* determines that the optimal window size at that time for the TCP connection should be 8760 bytes (in multiples of MSS). Accordingly, upon receiving the TCP ACK segment from the packet inspector, the window size optimizer 202b changes from 4380 to 8760. At (2), the TCP ACK with the new window size is sent to the local end device 204.

The specific values of the window size (e.g., 4380 or 8760) are examples provided for illustrative purposes only, without loss of generality. It should be understood that other values of the window size are possible in various implementations.

At (3a), the local end device 204 sends TCP data segments towards the remote end device 204, which are intercepted by the traffic optimizer 202. The larger window size (for example, 8760) triggers or enables the local end device 204 to send more TCP data segments than what it would have sent with the window size advertised by the remote end device (for example, 4380). The window size optimizer 202b analyzes the TCP data segments against the local window size advertised (8760) and the actual window size (4380). As long as the segments from local end device falls within the actual receive window of the remote end device, at (3b), the window size optimizer 202b forwards the segments to the remote end device as is.

Because the receive window calculation processing reevaluates the window size periodically, the window size optimizer 202b can increase the window size further to accelerate the data transfer. However, in the illustrated example, upon receiving a TCP ACK at (4a), the window size is not increased any further. At (4b), the traffic optimizer 202 forwards, to the local end device 204, the TCP segment with the modified window size that (8760) was determined by the window size optimizer 202b previously.

Under steady state conditions, TCP data segments sent from the local end are acknowledged by the remote end. The window size optimizer 202b selects a window size (8760 in the illustrated example) that, while triggering increase in TCP traffic flow, limits the chance of overflowing the actual receive window at the remote end device. In some cases, packet loss due to link error (e.g., degradation of satellite link conditions due to rain) can temporarily cause more TCP data segments to be received from the local end device 204, at (5). Under such conditions, the traffic optimizer 202 buffers segments that cannot be accommodated into the actual receive window. At (6), the window size optimizer 202b forwards each received segment to the overflow buffer 202c, where the received segments are buffered in sequence until the receive window of the remote end device 206 is capable of accepting all the buffered segments.

In some implementations, when storing the data segments in the overflow buffer 202c, the window size optimizer 202b performs queue depth assessment, that is, determines the number of TCP segments stored (e.g., the "queue depth") in the overflow buffer 202c. If the queue depth assessment indicates that the number of segments in the overflow buffer 202c is equal to or greater than a queue growth threshold value, then the window size optimizer 202b reduces the window size advertised to the local end device 204. This can be the case, for example, either because the remote end device 206 has advertised a low receive window size that causes the number of buffered segments to grow, or because the allocated satellite system bandwidth and link adaptation conditions are such that the receive data rate from the local end device is greater for some sustained time than the available forwarding bandwidth. In such implementations, the window size optimizer 202b reduces the window size advertised to the local end device 204 gradually to avoid window shrinkage. Further, for new TCP connections, the window size optimizer 202b may advertise a smaller window size to the local end device 204 than it would have if the number of segments in the overflow buffer 202c is less than the threshold value. In some cases, the queue depth assessment takes into account one or more factors, which include: the queue depth versus the window size advertised by the remote end device 206 for a given TCP flow; the aggregate queue depth versus available bandwidth across several different TCP flows for the local end device 204; or the aggregate queue depth versus available bandwidth across TCP flows for multiple local end devices. In some implementations, the queue growth threshold value is configurable, for example, can be set by a network administrator managing the terminal 102 or the gateway 106.

At (7a), a TCP ACK segment is received from the remote end device 206 and forwarded to the local end device 204 at (7b) with the modified window size. Receipt of the TCP ACK from the remote end device triggers transmission of buffered data segments from the traffic optimizer 202 to the remote end device 206. At (8a)-(8b), the window size optimizer 202b retrieves the data segments from the overflow buffer 202c in the same order in which the segments were buffered, and at (8c) these segments are forwarded to the remote end device 206.

Figure 6:
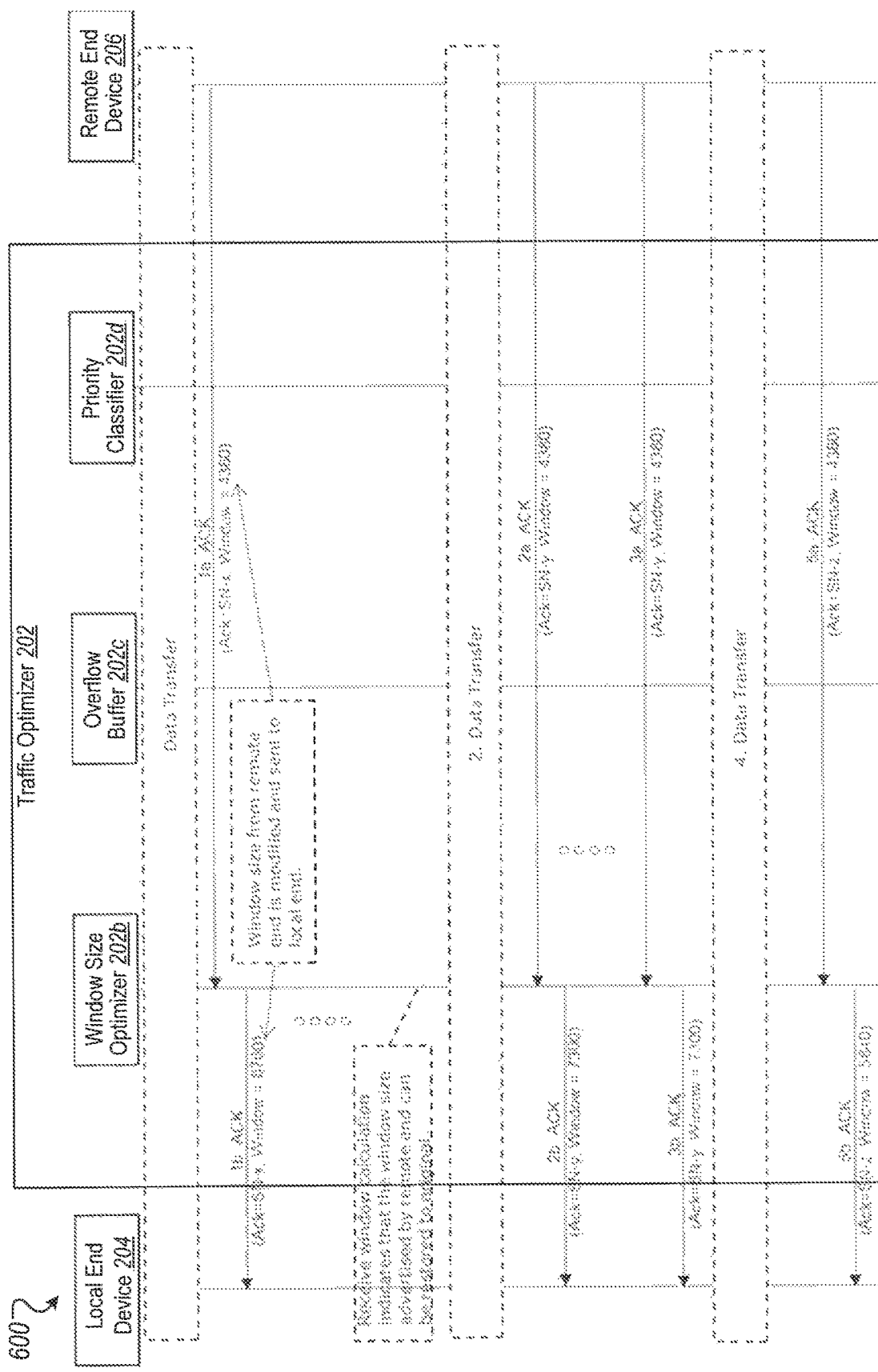
FIG. 6 illustrates a timing diagram showing a sequence of TCP protocol interactions among the traffic optimizer, local end device and remote end device to restore the TCP window size to the value advertised by the remote end device.

FIG. 6 illustrates a timing diagram 600 showing a sequence of TCP protocol interactions among the traffic optimizer 202, local end device 204 and remote end device 206 to restore the TCP window size to the value advertised by the remote end device. Only those components of the traffic optimizer 202 involved in the protocol interactions are shown for clarity and simplicity.

In some implementations, the restoration of window size is limited to situations when the buffer resources (e.g., space in the overflow buffer 202c) are to be used for other high priority TCP flows, or when the queue depth exceeds the queue growth threshold value, or the queue depth is unchanged for some time versus available satellite bandwidth. On the other hand, if there are sufficient buffer space and bandwidth available, then the TCP connection will continue with modified (larger) window size until the connection is released.

As shown by the timing diagram 600, and also described with respect to the timing diagram 500, when data transfer is in progress, then the TCP ACK received from the remote end device 206 at (1a) is modified to include a larger window size than the size advertised by the remote end, and then the TCP ACK segment is sent to the local end device at (1b).

In the course of data transfer for the TCP flow, the periodic window size calculation performed by the window size optimizer 202b indicates that the window size can be restored to the value advertised by the remote end device 206 for the specific TCP connection. For example, the local window size of 8760 should be restored back to the original value of 4380 advertised by the remote end device 206.

As described previously, the window size cannot be abruptly changed to a lower value in one message exchange, since doing so would result in window shrinkage, that is, right edge of the window moving left, which can cause TCP segment drops. Accordingly, the advertised window size is reduced by keeping the right edge of the window as is but moving the left edge of the window closer to the right edge, that is, the ACK number advances but the window size field grows smaller (for example, similar to a condition where data is delivered to the remote end device but is not yet consumed by the application running on the remote end device). Since the ACK number advances only when the remote end acknowledges data, upon receiving a TCP ACK segment from the remote end device at (2a), the window size optimizer 202b analyzes the segment to determine if the segment acknowledges data sent by the local end. If that is the case, then the window size optimizer reduces the window size field in the TCP ACK segment by the amount of data acknowledged. For example, as shown, the sequence number SN-y in the TCP ACK at (2a) is larger than the last acknowledged sequence number SN-x (by one MSS) at (1a). In this case, the window size optimizer 202b reduces the window size advertised to the local end device 204 by one MSS (for example, 1460 bytes). The TCP ACK segment with the reduced window size (7300 in this example) is sent towards the local end device 204 at (2b). In this manner, the window size optimizer 202b reduces the locally advertised window size when outstanding data is acknowledged by the remote end device and the original window size is smaller than the locally advertised value.

At (3a), a new TCP ACK segment is received from the remote end device 206 that does not acknowledge outstanding data, since the sequence number SN-y is unchanged from the previous TCP ACK sent at (2a). Accordingly, the new TCP ACK does not trigger a reduction in window size. Instead, the traffic optimizer 202 forwards the TCP ACK, modified with the last announced window size (7300 in the above example), to the local end device 204 at (3b).

Data transfer continues with more TCP data segments being sent by the local end device 204. At (5a), the remote end device 206 sends a TCP ACK that acknowledges one or more TCP segments, with the sequence number SN-z being higher than the last acknowledged value of SN-y by one MSS. Upon receiving the TCP ACK with the updated sequence number, the window size optimizer 202b further reduces the window size advertised to the local end device 204. For example, as shown in the illustrated example, the window size optimizer 202b reduces the window size by one MSS (1460) to 5840 bytes. At (5b), the TCP ACK with the reduced window size is forwarded to the local end device 204.

In bidirectional data transfers, TCP ACKs are normally piggybacked on TCP data segments. However, in asymmetric data flows (for example, a video download on a user device from a network server) in which the local end device acts as the receiver of data, the local end device can transmit many back-to-back TCP ACKs. While each ACK progressively acknowledges the received TCP data segments, the most recent ACK provides sufficient information for the remote end device to sustain the data flow at the same data rate. Transmitting only one TCP ACK to the remote end device over the satellite link, when two (or more) back-to-back ACKs are received from the local end device, is a more efficient use of allocated satellite bandwidth, since more of the bandwidth can be used for TCP data segments from other contemporaneous TCP flows. In some cases, back-to-back TCP ACKs can also occur in symmetric bidirectional data transfers, but to a lesser extent compared to asymmetric data flows.

In some implementations, where the TCP segments are processed by the window size optimizer 202b, the number of TCP ACKs originating from the local end device and sent to the remote end device are reduced by delaying a TCP ACK for a preselected wait time interval, in anticipation of receiving, from the local end device, a newer TCP ACK with a sequence number that supersedes the previous TCP ACK. If a new TCP ACK segment is not received from the local end device within the wait time interval, then the delayed TCP ACK segment is transmitted to the remote end device. However, if a new TCP ACK segment is received from the local end device within the wait time interval and with a sequence number that acknowledges more data, then the window size optimizer 202b discards the delayed TCP ACK, but transmits the new TCP ACK to the remote end device 206.

In some implementations, the wait time interval for which a TCP ACK is delayed is selected to be a value that has little or no impact on the end-to-end data transfer performance. The state information about the corresponding TCP connection that is maintained by the window size optimizer 202b, combined with information from bandwidth monitor 202f and link monitor 202e, is used to optimize the decision to delay the TCP ACK or fine tune the duration for which an ACK segment is delayed, or both. In such implementations, a) ACKs are not delayed until the TCP connection is in congestion avoidance phase. This prevents the TCP slow start phase from being adversely affected by fewer TCP ACKs.

b) ACKs are not delayed if the received TCP ACK indicates the possibility of a packet loss. This window size optimizer 202b determines that there is a packet loss if the TCP ACK received from the local end device 204 is a duplicate ACK and there is data pending acknowledgement, or if a selective acknowledgement (SACK) is received indicating one or more lost segments.

c) ACKs are delayed when there is high probability of receiving newer ACKs. This window size optimizer 202b determines the probability from the number of TCP data segments sent to the local end device 204, and the amount of data that is pending acknowledgment.

d) ACKs are not delayed if link conditions indicate increased probability of packet loss. This is to avoid the condition in which the first ACK was dropped in preference for a new ACK and the new ACK is discarded due to bit errors or cyclic redundancy check (CRC) errors.

e) The wait time interval for which a TCP ACK is delayed is based on next available bandwidth allocation/transmit opportunity. In some implementations, in absence of this information, a TCP ACK is delayed by a fixed value, for example, a value that is specified as a configuration parameter.

Figure 7:
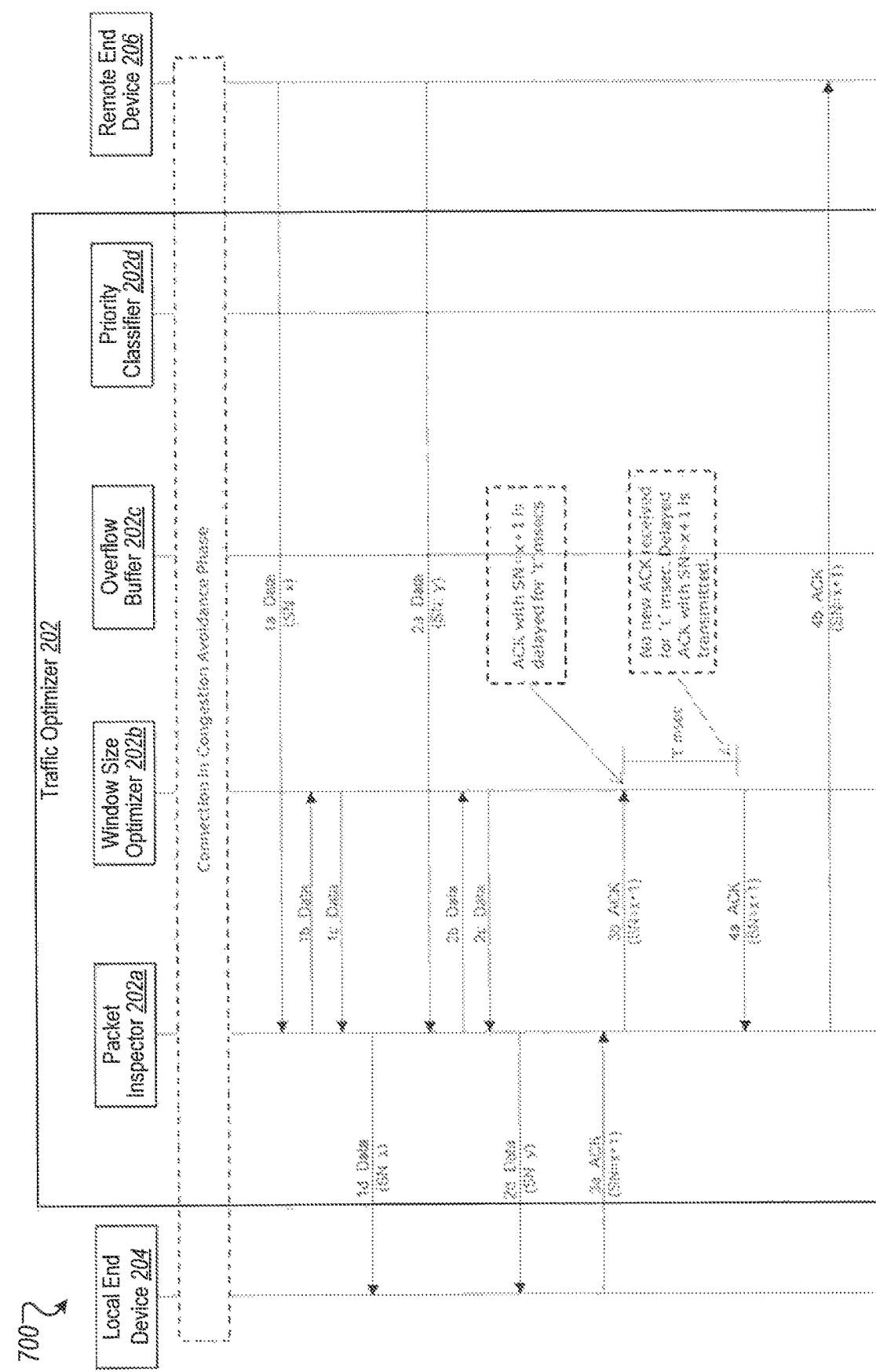
FIG. 7 illustrates a timing diagram showing a sequence of TCP protocol interactions among the traffic optimizer, local end device and remote end device for a condition in which a delayed TCP ACK is sent to the remote end device.

FIG. 7 illustrates a timing diagram 700 showing a sequence of TCP protocol interactions among the traffic optimizer 202, local end device 204 and remote end device 206 for a condition in which a delayed TCP ACK is sent to the remote end device 206. Only those components of the traffic optimizer 202 involved in the protocol interactions are shown for clarity and simplicity.

As shown by the timing diagram 700, when a TCP connection is in congestion avoidance phase, a TCP data segment is received at the packet inspector 202a from the remote end device 206 at, and forwarded by the packet inspector 202a to the window size optimizer 220b at (1b). The window size optimizer 202b records the sequence number (SN: x) and time at which the TCP data segment was received in a connection control block (CCB), and returns the TCP data segment to the packet inspector 202a at (1c). The segment with the sequence number x is then forwarded to the local end device 204 at (1d). A similar series of interactions occur for other TCP data segments, for example, for TCP data segment with SN: y at (2a)-2(d).

At (3a), the local end device 204 sends a TCP ACK with SN=x+1, which acknowledges the first TCP data segment with SN: x. The TCP ACK is received by the packet inspector 202a and forwarded to the window size optimizer 202b at (3b). The connection state information indicates that there is possibility of receiving more acknowledgements from the local end device 204. For example, the window size optimizer 202b determines that an acknowledgement for the TCP data segment with SN: y is pending. Accordingly, the window size optimizer 202b stores the received TCP ACK segment and delays transmission of the segment for a wait time interval of 't'. The wait time interval T can of the order of milliseconds or seconds.

In some implementations, the wait time interval T is a configuration parameter, whose value is set by a network administrator. In some other implementations, the value of T is dynamically determined by the window size optimizer 202b using the next transmit opportunity from bandwidth allocation. For example, in such implementations, given a time division multiple access (TDMA) or time division multiplexing (TDM) framing and the frame number in which the bandwidth is allocated, the window size optimizer 202b can estimate the wait time interval such that the TCP ACK is available just in time for transmission. This allows waiting for more than two consecutive ACKs, without impacting TCP segment transmissions by the remote end device.

Continuing with the example illustrated by timing diagram 700, a new TCP ACK (for example, acknowledging segment with SN: y) is not received at the traffic optimizer 202 from the local end device 204 upon expiry of the wait time interval T. Accordingly, at (4a), the window size optimizer 202b forwards the delayed TCP ACK (with SN=x+1) to the packet inspector 202a, which then transmits the delayed TCP ACK to the remote end device 206 at (4b). In this case, handling of the TCP ACK similar to the conventional case where the TCP ACK reduction mechanism is not used, except for the delay corresponding to the wait interval 't'.

Figure 8:
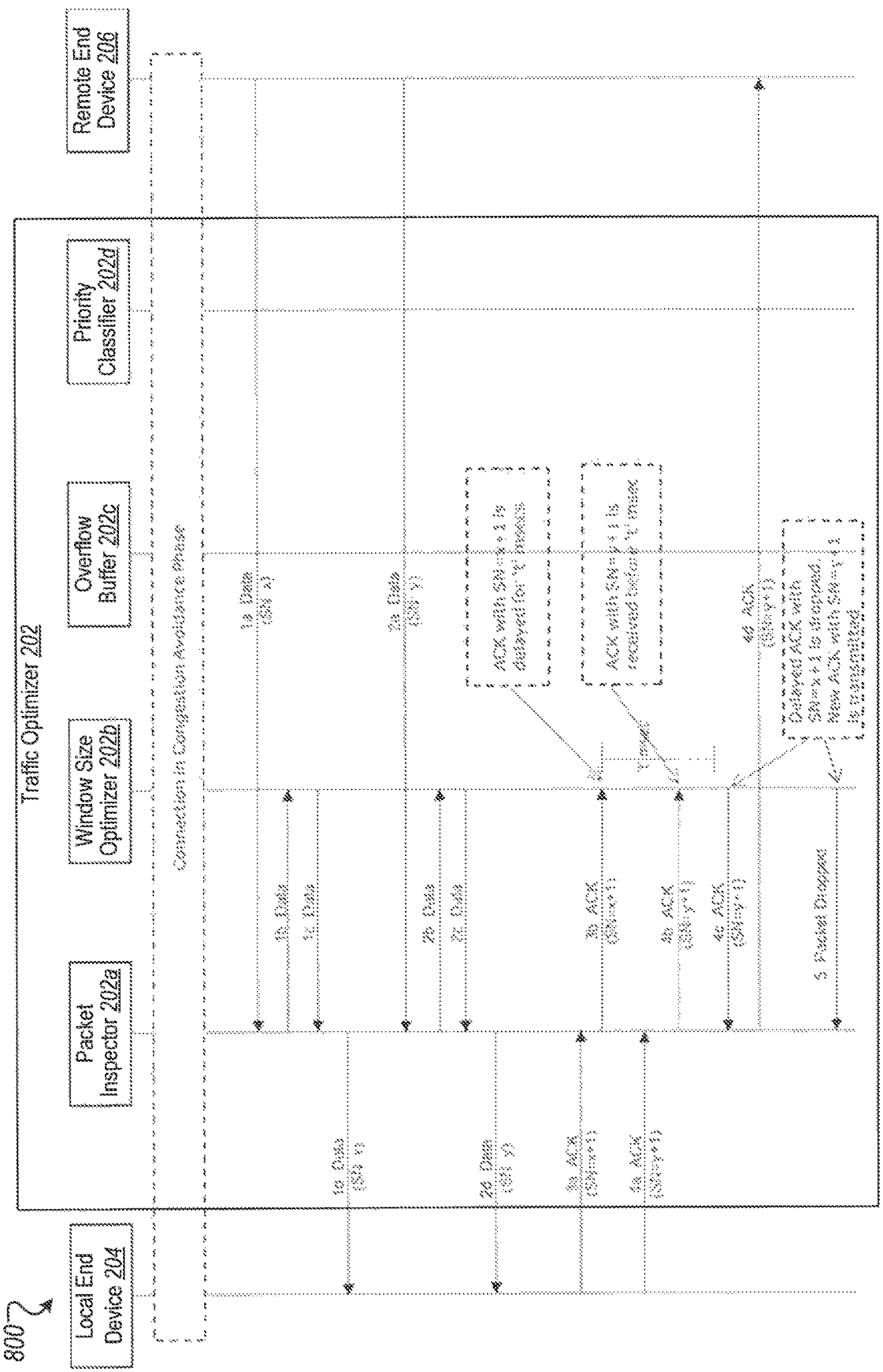
FIG. 8 illustrates a timing diagram showing a sequence of TCP protocol interactions among the traffic optimizer, local end device and remote end device for a condition in which a delayed TCP ACK is discarded because a new TCP ACK supersedes the previous TCP ACK.

FIG. 8 illustrates a timing diagram 800 showing a sequence of TCP protocol interactions among the traffic optimizer 202, local end device 204 and remote end device 206 for a condition in which a delayed TCP ACK is discarded because a new TCP ACK supersedes the previous TCP ACK. Only those components of the traffic optimizer 202 involved in the protocol interactions are shown for clarity and simplicity.

As shown by the timing diagram 800, when a TCP connection is in congestion avoidance phase, a TCP data segment is received at the packet inspector 202a from the remote end device 206 at, and forwarded by the packet inspector 202a to the window size optimizer 220b at (1b). The window size optimizer 202b records the sequence number (SN: x) and time at which the TCP data segment was received in a connection control block (CCB), and returns the TCP data segment to the packet inspector 202a at (1c). The segment with the sequence number x is then forwarded to the local end device 204 at (1d). A similar series of interactions occur for other TCP data segments, for example, for TCP data segment with SN: y at (2a)-(2d).

At (3a), the local end device 204 sends a TCP ACK with SN=x+1, which acknowledges the first TCP data segment with SN: x. The TCP ACK is received by the packet inspector 202a and forwarded to the window size optimizer 202b at (3b). The connection state information indicates that there is possibility of receiving more acknowledgements from the local end device 204. For example, the window size optimizer 202b determines that an acknowledgement for the TCP data segment with SN: y is pending. Accordingly, the window size optimizer 202b stores the received TCP ACK segment and delays transmission of the segment for a wait time interval of 't'.

At (4a), the local end device 204 transmits a new TCP ACK with SN y+1, which acknowledges TCP data segment with SN: y. The new TCP ACK is received by the packet inspector 202a and forwarded to the window size optimizer 202b at (4b), before the wait time interval T expires.

The window size optimizer 202b determines that the sequence number y+1 in the new ACK segment acknowledges TCP data segment with SN: y and therefore implicitly acknowledges previous TCP data segment with SN: x. Since the second TCP ACK with SN=y+1 supersedes the first TCP ACK with SN=x+1, the window size optimizer 202b discards the delayed TCP ACK with SN=x+1. At (4c), the window size optimizer 202b returns the TCP ACK with SN=y+1 to the packet inspector 202a, which forwards the TCP ACK at (4d) to the remote end device 206. The TCP ACK with SN=y+1 when received by remote end device 206, serves as confirmation to the remote end device that the local end device 204 has received TCP data segment with SN: y, and prior unacknowledged TCP data segments with lower sequence numbers, such as TCP data segment with SN: x.

At (5), the window size optimizer 202b informs the packet inspector that a packet (with TCP ACK segment) was dropped. This information ensures that the state information maintained by the packet inspector 202a for the TCP ACK segment received at 93a) is properly reset.

The techniques described above can be used for faster traffic ramp up for a TCP connection. For example, by tracking the state of each TCP connection, the window size optimizer 202b can determine which of the following scenarios is applicable:

i. Start of data transfer following establishment of TCP connection.
  ii. Data transfer while in TCP congestion avoidance.
  iii. Resuming data transfer while in TCP slow start.
  iv. Resuming data transfer while in TCP congestion avoidance.

In scenario (i), the data transfer following TCP connection establishment is controlled by TCP slow start behavior. During TCP slow start, traffic ramp up is aided by ensuring that the receive window size advertised towards the local (i.e., sending) end device is larger than the congestion control window size. If the remote end window size is smaller than the congestion window, then the local window size can be increased.

In scenario (ii), when the TCP connection enters congestion avoidance, the receive window size has a greater impact on performance of the TCP connection, compared to during connection establishment. As described previously, during the congestion avoidance phase, the window size optimizer 202b periodically evaluates the TCP connection to increase or decrease the window size advertised to the local end device 204, taking to account factors such as number of other flows, priority of this connection, link conditions, buffer availability (queue depth) versus bandwidth availability, among others. Scenario (iv) is same as data transfer in the congestion avoidance phase.

Scenario (iii) is similar to scenario (i). When a TCP connection is in slow start phase (for example, due to packet loss), then the window size optimizer 202b may increase the receive window size to ensure that the window size is not the limiting factor.

The disclosed techniques can also be used for bandwidth alignment. Satellite transport, like other wireless transport schemes, can be subject to more bandwidth fluctuations due link conditions, the amount of spectrum, or traffic load, or any combination of these, compared to wired transport connections. The fluctuations in satellite bandwidth can impact application performance. While some applications can be tuned to changing bandwidth, this tuning may not optimal, since the applications may be unaware of the nature of the underlying satellite transport channel and therefore cannot take proactive steps to compensate for bandwidth changes.

The manipulation of the window size by the traffic optimizer 202 can be used to proactively control the traffic flow by using transmit queue depth, transmit bandwidth allocation and transmit link condition information to determine the window size. The link monitor 202e and bandwidth monitor 202f provide, to the window size optimizer 202b, the information for the receive window calculation processing. The window size selected for each TCP flow controls the volume of traffic flow and queuing that in turn matches or smooths the flow rate to the actual bandwidth that is available for use.

The disclosed techniques can also be used for TCP flow prioritization. In a manner similar to the way in which link conditions and bandwidth allocation are used for determining the window size advertised to the local end device, the window size optimizer 202b can use a priority value assigned to a TCP traffic flow to calculate the window size. In some implementations, the priority value is derived using:

a) Configuration (for example, classifier rules based on TCP/IP header fields, virtual local area network (VLAN) identifier, among others).

b) Deep packet inspection techniques to recognize data patterns associated with applications such as voice or video.

c) Run time conditions (for example, number of connections, state of the TCP connection, among others).

The window size optimizer 202b takes priority into account when deciding the window size to be advertised towards the local end, during the periodic calculation. In some implementations, TCP flows with higher priority values are provided larger receive windows compared to TCP flows with lower priority values. In some implementations, queue depths are aggregated across multiple TCP flows that have the same priority. In such implementations, a high queue load across high priority flows as compared to aggregate satellite transmit bandwidth allocated to the terminal, triggers reduction of window sizes advertised to local end devices for lower priority flows. Use of the bandwidth and queue depth assessment helps to avoid dropping traffic that is invited by an advertised window value, but which rate exceeds queue and bandwidth resources, since such drops can lead to reduced traffic performance for a given TCP flow, and to wasted satellite bandwidth. For example, reduced traffic performance can occur because the remote end device will detect missed segments, interpret that event as indicative of transit network congestion, and reduce its advertised window. Satellite bandwidth can be wasted because successful delivery to the remote end device of a first and a third packet with loss of a second packet, can cause both the dropped second packet and the delivered third packet to be retransmitted.

The disclosed techniques can also be used for traffic smoothing. For example, window size manipulation in conjunction with the amount of bandwidth used can be used by the window size optimizer 202b to ensure that an incoming TCP flow has steady outflow rate towards the remote end device, especially when the incoming TCP flow exhibits frequent but momentary peaks. In some implementations, application of traffic smoothing is limited to flows that meet specific criteria, for example, a specific application, which can be inferred from TCP/IP header fields.

The disclosed techniques can also be used for service plan based data volume limit and rate throttling. For example, the ability to control the incoming traffic by adjusting the window size can be used to enforce quota or data volume limits, as well as the data rate based on service plan. In some implementations, the result of a process of metering and determining if volume/rate limit should be enforced is provided as an external control input to the window size optimizer 202b. The result takes into account the aggregate rate and volume of all TCP flows through the terminal, or all TCP flows of a given priority if such is an attribute of the service plan, or, for a multi-subscriber terminal, all TCP flows associated with a particular subscriber versus the service plan for that subscriber. When the configuration and control input (for example, configuration and control 102a or 112a) indicates that the volume and/or rate throttling should be enforced, then the window size optimizer 202b appropriately scales down the receive window sizes for all sending flows that originate from the local end device (or for the corresponding local subscriber, as applicable). In this manner, by using the window size for enforcing volume limits and rate throttling, throttling is enforced at the traffic origination point before satellite bandwidth is used and wasted, and overhead due to policing at the network is minimal because policed packets from throttled users do not transit the network.

The disclosed techniques can also be used for rate throttling due to network congestion. For example, in a manner similar to data volume or rate limiting described above, TCP receive window size can be used to limit the volume of traffic injected into the network during periods of congestion and high traffic volumes, taking into account terminal queue depths, as previously described. Congestion based throttling can also take into account service plans (for example, premium or standard plans) while reducing the receive window size. Unlike service plan based throttling, which can affect selected users for longer duration, congestion based throttling can be limited to the time period for which the congestion condition exists.

Congestion based throttling can be triggered in the terminal (e.g., terminal 102) based on one or more factors such as offered load versus queue depth, priority, or bandwidth allocation conditions, and can additionally be controlled from the gateway (e.g., gateway 112) using an advertised throttling factor. For example, if a factor at the gateway 112 constrains its ability to deliver to the terrestrial network the traffic rate received from terminal 102, e.g., reduction in terrestrial connectivity bandwidth, the gateway 112 can advertise a dampening factor to explicitly direct the terminal 112 to manipulate receive window sizes that are advertised to the corresponding attached sending user devices 104a, 104b or 104c, to constrain offered load from these terminal-attached devices. Alternatively, the gateway 112 can reduce its rate of allocating satellite bandwidth, with the back-pressure into the terminals causing terminal 102 to manipulate receive window sizes advertised to the user devices 104a, 104b or 104c.

Although the receive window size optimization techniques described above have been exemplified with respect to satellite networks, the techniques can also be applied to terrestrial wireless networks, as indicated previously. TCP PEPs are usually not used in terrestrial wireless networks, such as cellular networks, because the transit latency through such networks is generally lower than the latency for satellite systems, for example, lower than even the latency experienced in LEO satellite systems. However, in some cases, using the window size manipulation and TCP ACK reduction techniques described above can benefit terrestrial wireless networks, for example, by saving network bandwidth. For example, a wireless network that is subject to a high level of bandwidth congestion during busy hour periods can benefit from techniques that avoid retransmission of successfully delivered TCP segments. The techniques disclosed here can be employed to control the offered load from end hosts connected to wireless access devices (e.g., terminal 102), consistent with the bandwidth available to be allocated to those wireless access devices. The resulting saved network bandwidth can be used for data traffic, resulting in greater effective aggregate throughput. This can be provided for traffic and congestion in either direction, for example, traffic sent to remote wireless access devices from a base station, or traffic received by a base station from remote wireless access devices.

The techniques disclosed above and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, for example, code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, for example, code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, for example, an FPGA or an ASIC (application specific integrated circuit).

Processors suitable for the execution of a computer program include, by way of example, both general and special purpose microprocessors, and any one or more processors of any kind of digital computer. Computer readable media suitable for storing computer program instructions and data can include all forms of nonvolatile memory, media and memory devices. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A system comprising:
  a terrestrial terminal configured to communicate with one or more connected local hosts, the terrestrial terminal enabling communications, over a network connection through a satellite, between a local host of the one or more connected local hosts and a remote host, wherein the terrestrial terminal is configured to perform operations comprising:
    receiving a network packet from the remote host destined for the local host;
    obtaining, from the network packet, an included Transmission Control Protocol (TCP) segment;
    determining, from the TCP segment, a receive window size advertised by the remote host;
    computing, using one or more characteristics corresponding to the network connection, a target receive window size for the network connection;
    modifying the TCP segment by replacing the advertised receive window size with the target receive window size; and
    forwarding the network packet with the modified TCP segment to the local host.

2. The system of claim 1, wherein the operations comprise determining that the target receive window size is different from the advertised receive window size, and
  wherein modifying the TCP segment and forwarding the network packet with the modified TCP segment are performed in response to determining that the target receive window size is different from the advertised receive window size.

3. The system of claim 1, wherein the network packet is received in response to sending, to the remote host, a TCP connection request, and
wherein the TCP segment corresponds to a TCP SYN/ACK segment.

4. The system of claim 3, wherein the operations further comprise:
receiving, from the local host, a plurality of network packets, each network packet including a TCP data segment;
determining whether an aggregate size of TCP data segments included in the plurality of network packets is within the advertised receive window size of the remote host;
in response to determining that the aggregate size of the TCP data segments is greater than the advertised receive window size:
sending, to the remote host over the network connection, a subset of the plurality of network packets, wherein an aggregate size of TCP data segments included in the subset is within the advertised receive window size, and
buffering, in storage coupled to the terrestrial terminal, a remainder of the plurality of network packets;
receiving, from the remote host, a new network packet including a TCP ACK segment, the TCP ACK segment acknowledging successful reception, by the remote host, of network packets sent from the local host; and
in response to receiving the new network packet including the TCP ACK segment, sending, to the remote host over the network connection, one or more of the remainder of the plurality of network packets that are buffered in the storage.

5. The system of claim 3, wherein the operations further comprise:
receiving, from the local host, one or more network packets, each network packet including a TCP data segment;
sending, to the remote host over the network connection, the one or more network packets;
receiving, from the remote host, a new network packet including one of a TCP ACK segment or a TCP data segment, wherein the TCP ACK segment or the TCP data segment includes the advertised receive window size;
in response to receiving the new network packet, computing, using the one or more characteristics corresponding to the network connection, a new target receive window size for the network connection;
comparing the new target receive window size with the advertised receive window size; and
in response to determining, based on the comparison, that the new target receive window size is different from the advertised receive window size:
modifying the TCP ACK segment or the TCP data segment by replacing the advertised receive window size with the new target receive window size, and
forwarding the network packet with the modified TCP ACK segment or the modified TCP data segment to the local host.

6. The system of claim 5, wherein:
the target receive window size is smaller than the advertised receive window size, and
the new target receive window size is greater than the advertised receive window size.

7. The system of claim 5, wherein:
the target receive window size is greater than the advertised receive window size, and
the new target receive window size is greater than the target receive window size.

8. The system of claim 3, wherein the target receive window size is greater than the advertised receive window size, and wherein the operations further comprise:
receiving, from the local host, one or more network packets, each network packet including a TCP data segment;
sending, to the remote host over the network connection, the one or more network packets;
identifying a local condition to reduce the target receive window size to the advertised receive window size;
receiving, from the remote host, new network packets, each including one of a TCP ACK segment or a TCP data segment, wherein the TCP ACK segment or the TCP data segment includes the advertised receive window size; and
forwarding, to the local host, the new network packets, including modifying the TCP ACK segment or the TCP data segment in each successive network packet by replacing the advertised receive window size with a successively lower target receive window size, until forwarding a network packet with the lowered target receive window size in a TCP ACK segment or a TCP data segment being equal to the advertised receive window size.

9. The system of claim 3, wherein the operations further comprise:
receiving, from the remote host over the network connection, one or more new network packets, each new network packet including a TCP data segment;
forwarding, to the local host, the one or more new network packets;
receiving, from the local host, a first network packet including a first TCP ACK segment, the first TCP ACK segment acknowledging successful reception, by the local host, of a new network packet sent from the remote host;
buffering, in storage coupled to the terrestrial terminal, the first network packet;
upon buffering the first network packet, starting a timer;
before expiration of the timer, receiving, from the local host, a second network packet including a second TCP ACK segment, the second TCP ACK segment acknowledging successful reception, by the local host, of another new network packet sent from the remote host; and
in response to receiving the second network packet before expiration of the timer:
sending, to the remote host over the network connection, the second network packet including the second TCP ACK segment, and
dropping the first network packet.

10. The system of claim 3, wherein the operations further comprise:
receiving, from the remote host over the network connection, one or more new network packets, each new network packet including a TCP data segment;
forwarding, to the local host, the one or more new network packets;
receiving, from the local host, a first network packet including a TCP ACK segment, the TCP ACK segment acknowledging successful reception, by the local host, of a new network packet sent from the remote host;

buffering, in storage coupled to the terrestrial terminal, the first network packet;
upon buffering the first network packet, starting a timer;
determining whether another network packet is received from the local host before expiration of the timer; and
upon expiration of the timer and in response to determining another network packet has not been received from the local host before expiration of the timer, sending, to the remote host over the network connection, the first network packet.

11. A method comprising:
receiving, at a terrestrial terminal that is configured to enable communications between a local host of one or more connected local hosts and a remote host over a network connection through a satellite, a network packet from the remote host destined for the local host;
obtaining, from the network packet, an included Transmission Control Protocol (TCP) segment;
determining, from the TCP segment, a receive window size advertised by the remote host;
computing, using one or more characteristics corresponding to the network connection, a target receive window size for the network connection;
modifying the TCP segment by replacing the advertised receive window size with the target receive window size; and
forwarding the network packet with the modified TCP segment to the local host.

12. The method of claim 11, comprising determining that the target receive window size is different from the advertised receive window size,
wherein modifying the TCP segment and forwarding the network packet with the modified TCP segment are performed in response to determining that the target receive window size is different from the advertised receive window size.

13. The method of claim 11, wherein receiving the network packet comprises receiving
the network packet in response to sending, to the remote host, a TCP connection request, and
wherein the TCP segment corresponds to a TCP SYN/ACK segment.

14. The method of claim 13, further comprising:
receiving, from the local host, a plurality of network packets, each network packet including a TCP data segment;
determining whether an aggregate size of TCP data segments included in the plurality of network packets is within the advertised receive window size of the remote host;
in response to determining that the aggregate size of the TCP data segments is greater than the advertised receive window size:
sending, to the remote host over the network connection, a subset of the plurality of network packets, wherein an aggregate size of TCP data segments included in the subset is within the advertised receive window size, and
buffering, in storage coupled to the terrestrial terminal, a remainder of the plurality of network packets;
receiving, from the remote host, a new network packet including a TCP ACK segment, the TCP ACK segment acknowledging successful reception, by the remote host, of network packets sent from the local host; and
in response to receiving the new network packet including the TCP ACK segment, sending, to the remote host over the network connection, one or more of the remainder of the plurality of network packets that are buffered in the storage.

15. The method of claim 13, further comprising:
receiving, from the local host, one or more network packets, each network packet including a TCP data segment;
sending, to the remote host over the network connection, the one or more network packets;
receiving, from the remote host, a new network packet including one of a TCP ACK segment or a TCP data segment, wherein the TCP ACK segment or the TCP data segment includes the advertised receive window size; and
in response to receiving the new network packet, computing, using the one or more characteristics corresponding to the network connection, a new target receive window size for the network connection;
comparing the new target receive window size with the advertised receive window size; and
in response to determining, based on the comparison, that the new target receive window size is different from the advertised receive window size:
modifying the TCP ACK segment or the TCP data segment by replacing the advertised receive window size with the new target receive window size, and
forwarding the network packet with the modified TCP ACK segment or the modified TCP data segment to the local host.

16. The method of claim 15, wherein:
the target receive window size is smaller than the advertised receive window size, and
the new target receive window size is greater than the advertised receive window size.

17. The method of claim 15, wherein:
the target receive window size is greater than the advertised receive window size, and
the new target receive window size is greater than the target receive window size.

18. The method of claim 13, wherein the target receive window size is greater than the advertised receive window size, the method further comprising:
receiving, from the local host, one or more network packets, each network packet including a TCP data segment;
sending, to the remote host over the network connection, the one or more network packets;
identifying a local condition to reduce the target receive window size to the advertised receive window size;
receiving, from the remote host, new network packets, each including one of a TCP ACK segment or a TCP data segment, wherein the TCP ACK segment or the TCP data segment includes the advertised receive window size; and
forwarding, to the local host, the new network packets, including modifying the TCP ACK segment or the TCP data segment in each successive network packet by replacing the advertised receive window size with a successively lower target receive window size, until forwarding a network packet with the lowered target receive window size in a TCP ACK segment or a TCP data segment being equal to the advertised receive window size.

19. The method of claim 13, further comprising:
receiving, from the remote host over the network connection, one or more new network packets, each new network packet including a TCP data segment;

forwarding, to the local host, the one or more new network packets;

receiving, from the local host, a first network packet including a first TCP ACK segment, the first TCP ACK segment acknowledging successful reception, by the local host, of a new network packet sent from the remote host;

buffering, in storage coupled to the terrestrial terminal, the first network packet;

upon buffering the first network packet, starting a timer;

before expiration of the timer, receiving, from the local host, a second network packet including a second TCP ACK segment, the second TCP ACK segment acknowledging successful reception, by the local host, of another new network packet sent from the remote host; and in response to receiving the second network packet before expiration of the timer:
    sending, to the remote host over the network connection, the second network packet including the second TCP ACK segment, and
    dropping the first network packet.

20. One or more non-transitory computer-readable media storing instructions that, when executed by one or more processors, are configured to cause the one or more processors to perform operations comprising:

receiving, at a terrestrial terminal that is configured to enable communications between a local host of one or more connected local hosts and a remote host over a network connection through a satellite, a network packet from the remote host destined for the local host;

obtaining, from the network packet, an included Transmission Control Protocol (TCP) segment;

determining, from the TCP segment, a receive window size advertised by the remote host;

computing, using one or more characteristics corresponding to the network connection, a target receive window size for the network connection;

modifying the TCP segment by replacing the advertised receive window size with the target receive window size; and forwarding the network packet with the modified TCP segment to the local host.

\* \* \* \* \*